(12) United States Patent
Toews

(10) Patent No.: US 9,007,194 B1
(45) Date of Patent: Apr. 14, 2015

(54) VEHICULAR ANTI-THEFT DEVICE

(71) Applicant: Dennis E. Toews, Boerne, TX (US)

(72) Inventor: Dennis E. Toews, Boerne, TX (US)

( * ) Notice: Subject to any disclaimer, the term of this patent is extended or adjusted under 35 U.S.C. 154(b) by 170 days.

(21) Appl. No.: 13/873,492

(22) Filed: Apr. 30, 2013

(51) Int. Cl.
*B60R 25/10* (2013.01)

(52) U.S. Cl.
CPC .................................. *B60R 25/1004* (2013.01)

(58) Field of Classification Search
CPC ............... G08B 13/1472; G08B 13/10; B60R 2300/406; B60R 25/1004
USPC ............ 340/426.1, 426.22, 426.23, 431, 432, 340/427, 426.2, 568.1, 665, 666
See application file for complete search history.

(56) References Cited

U.S. PATENT DOCUMENTS

| | | | | |
|---|---|---|---|---|
| 1,658,848 A | * | 2/1928 | Kalikow | 340/541 |
| 1,776,992 A | * | 9/1930 | Brockman | 200/86 R |
| 4,127,031 A | | 11/1978 | Barnes | |
| 4,222,043 A | * | 9/1980 | Malavasi | 340/541 |
| 4,780,706 A | * | 10/1988 | Bollag | 340/666 |
| 4,994,793 A | * | 2/1991 | Curtis | 340/666 |
| 5,041,815 A | * | 8/1991 | Newton | 340/568.6 |
| 5,159,316 A | * | 10/1992 | Lazzara | 340/568.2 |
| 5,196,827 A | * | 3/1993 | Allen et al. | 340/568.1 |
| 5,210,528 A | * | 5/1993 | Schulman et al. | 340/666 |
| 5,574,424 A | | 11/1996 | Nguyen | |
| 6,064,629 A | | 5/2000 | Stringer et al. | |
| 6,177,876 B1 | | 1/2001 | Krueger | |
| 6,369,459 B1 | | 4/2002 | Stevens | |
| 2011/0309934 A1 | * | 12/2011 | Henson et al. | 340/568.2 |

* cited by examiner

*Primary Examiner* — Eric M Blount
(74) *Attorney, Agent, or Firm* — Kyle A. Fletcher, Esq.

(57) ABSTRACT

The vehicular anti-theft device is a generally planar matt that includes a plurality of pressure sensors used to detect the presence of a weight thereon, and which is configured for placement under a tire of a vehicle. The matt includes a control panel to input a code to able and disable the alarm function. The alarm function is designed to detect a change in the weight associated with theft of a respective vehicle. The matt may include an array of solar cells on a top surface, which provides alternative means of powering the alarm function. The alarm includes a speaker to emit an audible alarm or alternatively cellular telephone capability in order to signal an alarm via a text message, phone message, or e-mail.

17 Claims, 3 Drawing Sheets

VEHICULAR ANTI-THEFT DEVICE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of vehicles, more specifically, a device that detects attempted theft of a vehicle via movement of a tire associated with said vehicle.

Vehicular theft is an ongoing problem. This is an emerging problem with the advent of or increasing growth of customized golf carts, side-by-side ATVs, four-wheelers, motorcycles, etc.

What is needed is a matt that can be placed under a tire of any type of vehicle in order to detect a weight applied thereon, and upon a detection of a change in weight, an alarm will sound. The device of the present application seeks to address this need and more, by providing a relatively simple device that can be used to issue an audible alarm upon detection of a change in the weight or pressure applied to the matt.

B. Discussion of the Prior Art

As will be discussed immediately below, no prior art discloses a generally planar matt that includes a plurality of pressure sensors used to detect the presence of a weight thereon, and which is configured for placement under a tire of a vehicle; wherein the matt includes a control panel to input a code to able and disable the alarm function, which detects a change in the weight associated with theft of a respective vehicle; wherein the matt includes an array of solar cells on a top surface, which provides alternative means of powering the invention; wherein the alarm includes a speaker to emit an audible alarm or alternatively cellular telephone capability in order to signal an alarm via a text message, phone message, or e-mail; wherein the pressure sensors signal the alarm as it pertains to either an increase or decrease in weight sensed as a theft may involve stealing items off of the vehicle.

The Stevens Patent (U.S. Pat. No. 6,369,459) discloses a weight sensing anti-theft vehicle system for preventing theft and carjacking of vehicles. However, the system does not employ a weight-sensing matt that is placed under a tire of a vehicle in order to sense a change in weight.

The Stringer et al. Patent (U.S. Pat. No. 6,064,629) discloses an apparatus for ensuring accuracy of weight measurement of objects on a conveyor and providing security against pilferage or miscoding of the objects. Again, the apparatus is not a matt that is configured for placement under one tire of a vehicle.

The Nguyen Patent (U.S. Pat. No. 5,574,424) discloses an anti-carjacking/theft device that is triggered by the activation of a weight sensor in the vehicle. However, the device is not a matt that is configured for placement under one tire of a vehicle.

The Barnes Patent (U.S. Pat. No. 4,127,031) discloses an attempted boat theft that is detected by measuring the increased displacement of the boat caused by the added weight of the thief. Again, the device is not positioned between a tire of a vehicle and the ground in order to detect a change in the weight of the vehicle being protected via the alarm.

The Newton Patent (U.S. Pat. No. 5,041,815) discloses a weight sensing golf bag alarm system that actuates an alarm when a thief is attempting to remove the golf bag without authorization. However, the system is unable to be placed under a tire of a vehicle in order to detect theft.

The Krueger Patent (U.S. Pat. No. 6,177,876) discloses a pressure sensitive alarm component that includes a pressure plate and a base plate. Again, the component or plates are not a matt that is placed under a tire to detect a change in weight of a vehicle.

While the above-described devices fulfill their respective and particular objects and requirements, they do not describe a generally planar matt that includes a plurality of pressure sensors used to detect the presence of a weight thereon, and which is configured for placement under a tire of a vehicle; wherein the matt includes a control panel to input a code to able and disable the alarm function, which detects a change in the weight associated with theft of a respective vehicle; wherein the matt includes an array of solar cells on a top surface, which provides alternative means of powering the invention; wherein the alarm includes a speaker to emit an audible alarm or alternatively cellular telephone capability in order to signal an alarm via a text message, phone message, or e-mail; wherein the pressure sensors signal the alarm as it pertains to either an increase or decrease in weight sensed as a theft may involve stealing items off of the vehicle. In this regard, the vehicular anti-theft device departs from the conventional concepts and designs of the prior art.

SUMMARY OF THE INVENTION

The vehicular anti-theft device is a generally planar matt that includes a plurality of pressure sensors used to detect the presence of a weight thereon, and which is configured for placement under a tire of a vehicle. The matt includes a control panel to input a code to able and disable the alarm function. The alarm function is designed to detect a change in the weight associated with theft of a respective vehicle. The matt may include an array of solar cells on a top surface, which provides alternative means of powering the alarm function. The alarm includes a speaker to emit an audible alarm or alternatively cellular telephone capability in order to signal an alarm via a text message, phone message, or e-mail. The pressure sensors signal the alarm as it pertains to either an increase or decrease in weight sensed as a theft may involve stealing items off of the vehicle.

It is an object of the invention to provide a matt that is able to lie flat on a ground surface, which is generally planar, and is configured for placement of a tire of a vehicle thereon in order to detect a weight applied thereto, and upon changing of said weight, the invention will emit an alarm.

A further object of the invention is to provide a matt that includes a plurality of pressure sensors that detect the pressure of a portion of the weight of the vehicle placed thereon via a tire.

A further object of the invention is to provide an alarm that emits an audible alarm via a speaker.

A further object of the invention is to provide alternative alarm formats, which include a cellular telephone transceiver that is able to communicate an alarm via a text message, phone call, or e-mail to an intended recipient.

An even further object of the invention is for the pressure sensors to signal the detection of an increase or decrease in weight.

Another object of the invention is to provide an array of solar cells on a top surface, which provides alternative manner of powering the invention.

These together with additional objects, features and advantages of the vehicular anti-theft device will be readily apparent to those of ordinary skill in the art upon reading the following detailed description of presently preferred, but nonetheless illustrative, embodiments of the vehicular anti-theft device when taken in conjunction with the accompanying drawings.

In this respect, before explaining the current embodiments of the vehicular anti-theft device in detail, it is to be understood that the vehicular anti-theft device is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the vehicular anti-theft device.

It is therefore important that the claims be regarded as including such equivalent construction insofar as they do not depart from the spirit and scope of the vehicular anti-theft device. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

Figure 1:
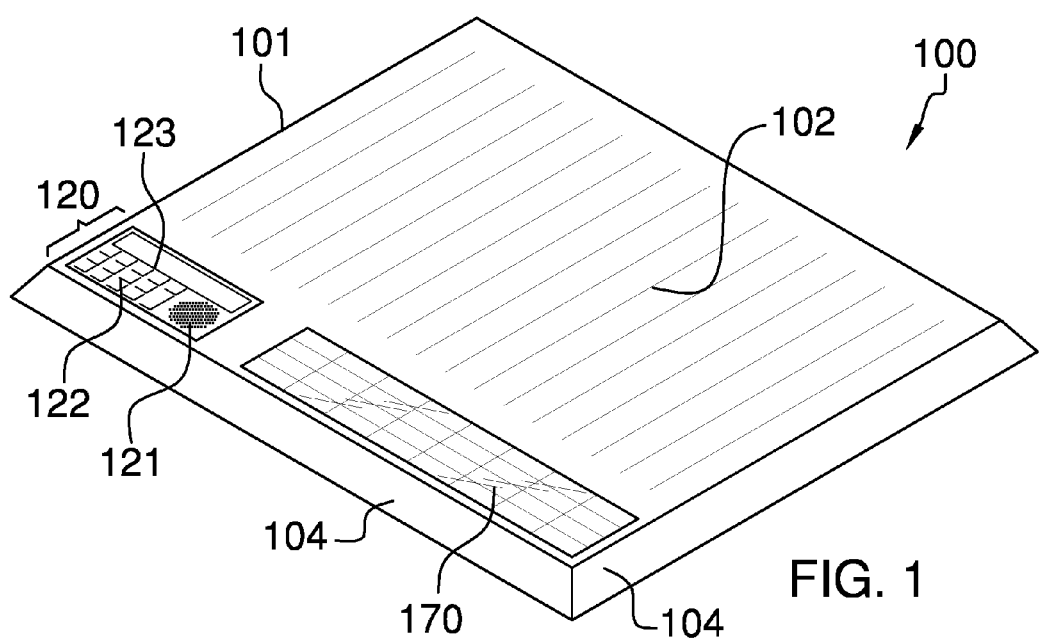
FIG. 1 illustrates a perspective view of the vehicular anti-theft device.
Figure 2:
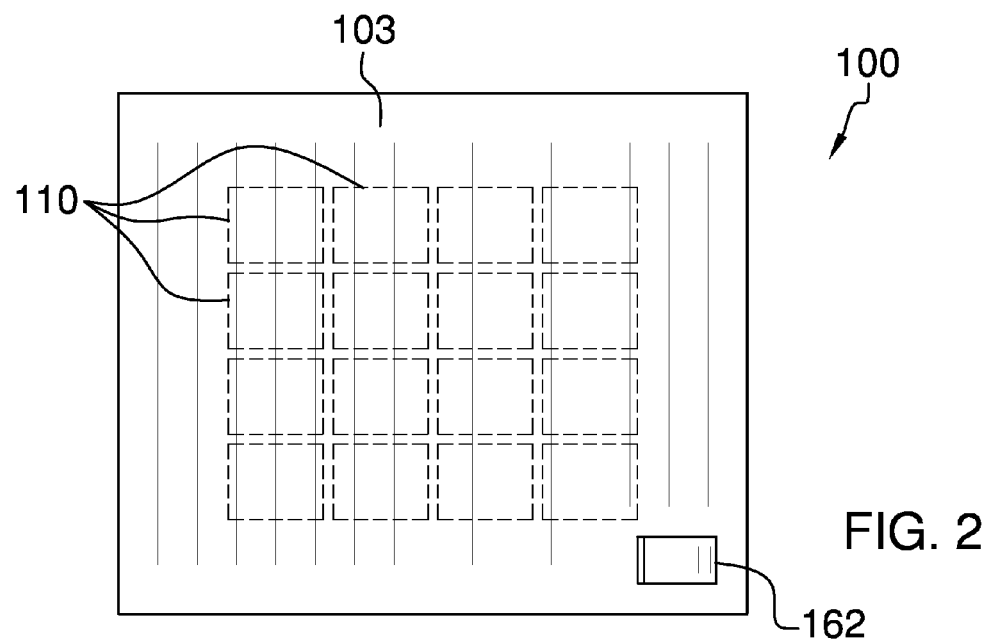
FIG. 2 illustrates a bottom view of the vehicular anti-theft device.
Figure 3:
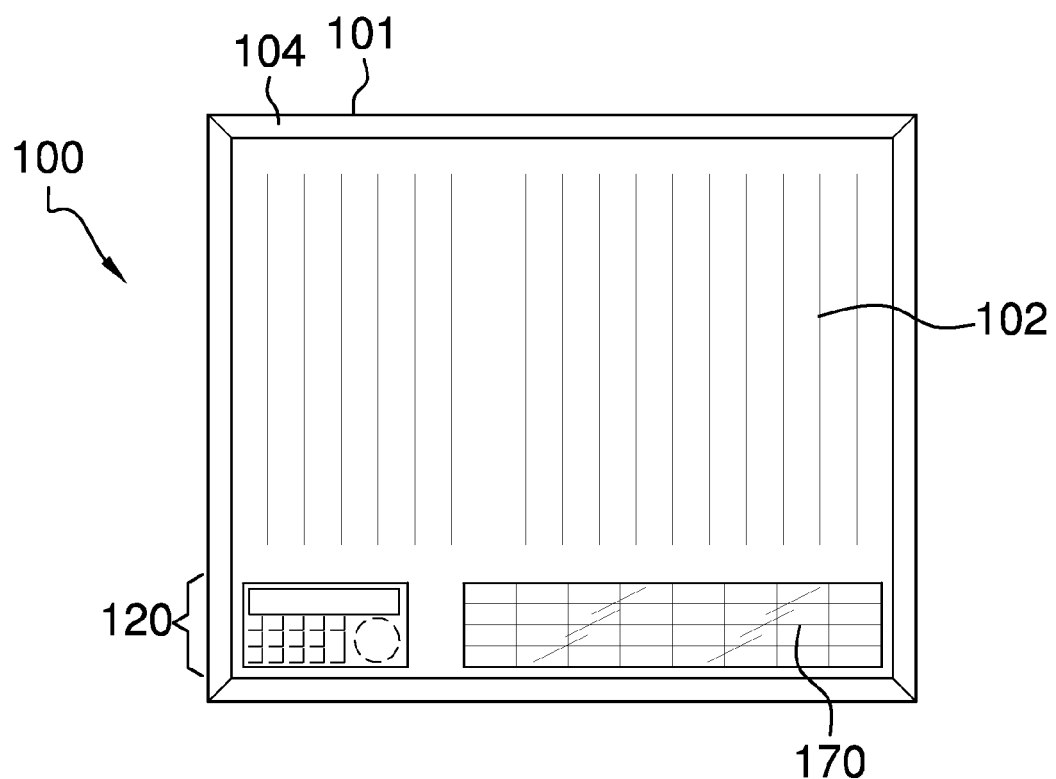
FIG. 3 illustrates a top view of the vehicular anti-theft device.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to the preferred embodiment of the present invention, examples of which are illustrated in FIGS. 1-6. A vehicular anti-theft device 100 (hereinafter invention) is further defined with a matt 101 that is a generally rectangularly-shaped object that is planar, and includes a top surface 102 as well as a bottom surface 103. Side surfaces 104 are angled with respect to a ground surface 200. Moreover, the matt has a height 105 that is relatively small in comparison to the overall surface area of the bottom surface 103 or the top surface 102. The matt 101 is to be placed on the ground surface 200, and a vehicle 300 is to be driven onto the matt 101 in order for at least one tire 301 of the vehicle 300 to rest onto the top surface 102.

Located inside of the matt 101 are a plurality of pressure sensors 110, which detect the weight associated with the tire 301 of the vehicle 300 at rest atop of the top surface 102 of the matt 101. It shall be noted that the invention 100 is designed to be used with the tire 301 resting atop of the top surface 102 for prolonged periods.

A control panel 120 is provided on the top surface 102, and includes a speaker 121, a plurality of buttons 122, and possibly a display 123. The buttons 122 enable a code to be entered for activating or de-activating an alarm 130. A central processing unit (hereinafter CPU) 140 located inside of the matt 101 is in wired communication with the speaker 121, the buttons 122, the display 123. The CPU 140 is designed to detect a change in the amount of weight applied via the tire 301 of the vehicle 300, which is sensed via the pressure sensors 110. It shall be noted that in FIG. 6, the pressure sensors 110 are denoted as "scale sensor", and that the two terms are being used synonymously.

The CPU 140 also includes a scale verification 115 that correlates that the reading of the pressure sensors 110 is in fact accurate and correct. The detection of a change in the weight as it pertains to the pressure sensors 110 signals the CPU 140 to emit an audible alarm via the speaker 121 and the alarm 130. The alarm 130 is also in wired communication with a cellular telephone transceiver 135, which is able to wirelessly communicate an alarm to an intended recipient via a text message, a phone call, or an e-mail.

Figure 6:
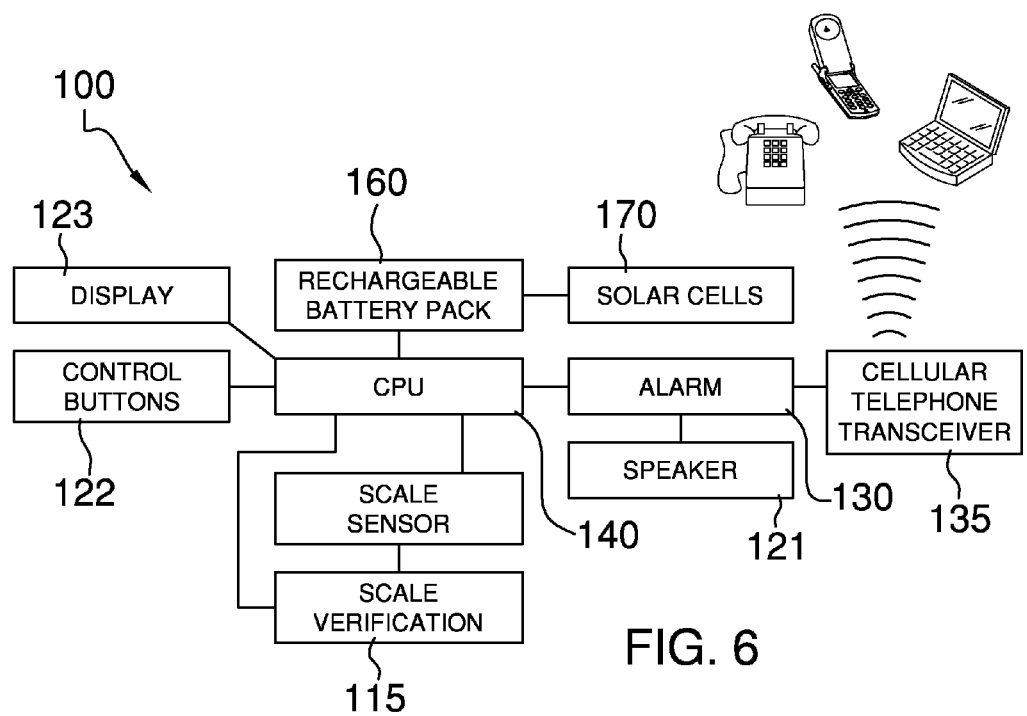
FIG. 6 illustrates a view of the componentry associated with the vehicular anti-theft device.

The invention 100, and more specifically, the CPU 140 is provided electrical power via a powering member 160. The powering member 160 includes at least one battery that is contained within a battery compartment 162. The battery compartment 162 is accessible from the bottom surface 103 of the matt 101. The invention 100 may further include an array of solar cells 170, which are located on the top surface 102 of the matt 101. The solar cells 170 provide an alternative means of powering the CPU 140 and/or recharge the powering member 160. FIG. 6 denotes "rechargeable battery pack", which is also being used to refer to the powering member 160.

Figure 4:
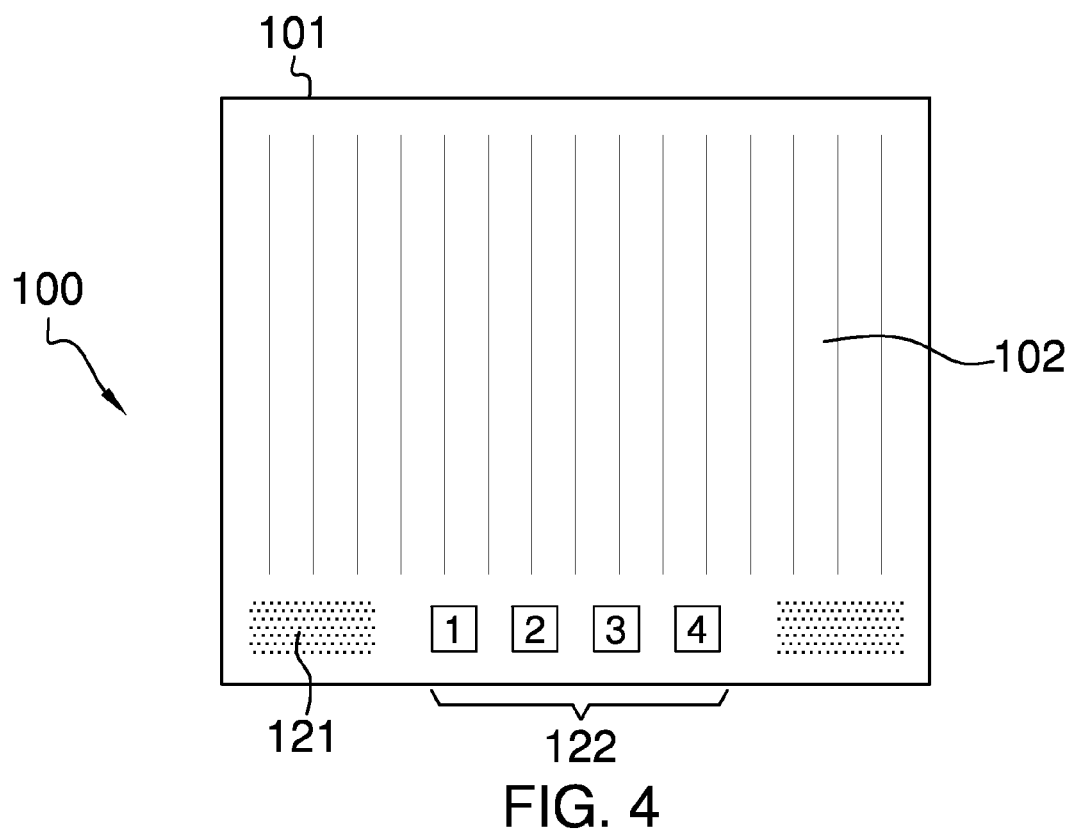
FIG. 4 illustrates a top view of an alternative embodiment of the vehicular anti-theft device.
Figure 5:
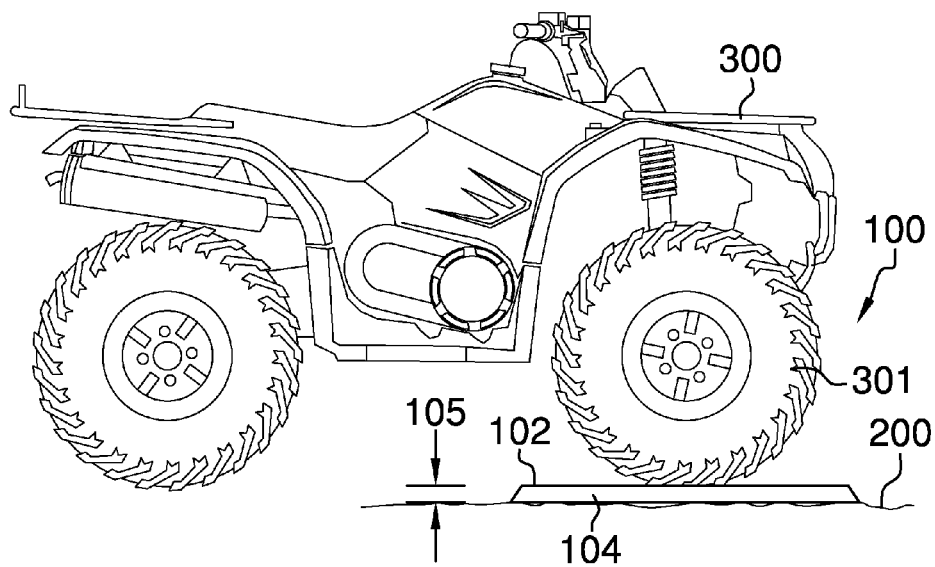
FIG. 5 illustrates a side view of the vehicular anti-theft device in use.

FIG. 4 depicts an alternative embodiment of the invention 100, which replaces the solar cells 170 and the control panel 120 with speakers 121, and buttons 122 positioned there between. This embodiment of the invention 100 simplifies the componentry, and only requires an input of a code to activate or deactivate the alarm. Other than that, the overall functionality of the alternative embodiment is identical with that of the previously defined embodiments of the invention 100 above.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A vehicular anti-theft device comprising:
    a matt configured for use in placement of a tire of a vehicle thereon;
    wherein at least one pressure sensor detects the weight of the tire placed thereon, and upon a change in the detected weight, an alarm will sound via a speaker;
    wherein the matt is a generally rectangularly-shaped object that is planar, and includes a top surface as well as a bottom surface; wherein the matt is further defined with side surfaces that are angled with respect to a bottom surface;
    wherein the matt has a height of not more than 2 inches;
    wherein the tire of the vehicle comes to rest upon the top surface of the matt;
    wherein a control panel is provided on the top surface, and includes the speaker, a plurality of buttons, and a display.

2. The vehicular anti-theft device as described in claim 1 wherein the buttons are selectively depressed to enter a code for activation or de-activation of the alarm.

3. The vehicular anti-theft device as described in claim 2 wherein a CPU located inside of the matt is in wired communication with the speaker, the buttons, the display.

4. The vehicular anti-theft device as described in claim 2 wherein the CPU is in wired communication with the pressure sensor to detect a change in the amount of weight applied via the tire of the vehicle.

5. The vehicular anti-theft device as described in claim 4 wherein the alarm is in wired communication with a cellular telephone transceiver, which is able to wirelessly communicate an alarm to an intended recipient via a text message, a phone call, or an e-mail.

6. The vehicular anti-theft device as described in claim 4 wherein the CPU is provided electrical power via a powering member; wherein the powering member includes at least one battery that is contained within a battery compartment.

7. The vehicular anti-theft device as described in claim 6 wherein the battery compartment is accessible from the bottom surface of the matt.

8. The vehicular anti-theft device as described in claim 7 wherein an array of solar cells located on the top surface of the matt provide electrical power to the CPU and/or the powering member.

9. A vehicular anti-theft device comprising:
    a matt configured for use in placement of a tire of a vehicle thereon;
    wherein at least one pressure sensor detects the weight of the tire placed thereon, and upon a change in the detected weight, an alarm will sound via a speaker;
    wherein the matt is a generally rectangularly-shaped object that is planar, and includes a top surface as well as a bottom surface; wherein the matt is further defined with side surfaces that are angled with respect to a bottom surface;
    wherein the tire of the vehicle comes to rest upon the top surface of the matt;
    a control panel is provided on the top surface, and includes the speaker, a plurality of buttons, and a display.

10. The vehicular anti-theft device as described in claim 9 wherein the matt has a height of not more than 2 inches.

11. The vehicular anti-theft device as described in claim 10 wherein the buttons are selectively depressed to enter a code to for activation or de-activation of the alarm.

12. The vehicular anti-theft device as described in claim 11 wherein a CPU located inside of the matt is in wired communication with the speaker, the buttons, the display.

13. The vehicular anti-theft device as described in claim 12 wherein the CPU is in wired communication with the pressure sensor to detect a change in the amount of weight applied via the tire of the vehicle.

14. The vehicular anti-theft device as described in claim 13 wherein the alarm is in wired communication with a cellular telephone transceiver, which is able to wirelessly communicate an alarm to an intended recipient via a text message, a phone call, or an e-mail.

15. The vehicular anti-theft device as described in claim 14 wherein the CPU is provided electrical power via a powering member; wherein the powering member includes at least one battery that is contained within a battery compartment.

16. The vehicular anti-theft device as described in claim 15 wherein the battery compartment is accessible from the bottom surface of the matt.

17. The vehicular anti-theft device as described in claim 16 wherein an array of solar cells located on the top surface of the matt provide electrical power to the CPU and/or the powering member.

\* \* \* \* \*